(12) United States Patent
Turney et al.

(10) Patent No.: US 10,100,919 B1
(45) Date of Patent: Oct. 16, 2018

(54) SHIFTER ASSEMBLY

(71) Applicant: Kongsberg Power Products Systems I, Inc., Willis, TX (US)

(72) Inventors: Christopher Glenn Turney, The Woodlands, TX (US); Carlos Jose Pena, Trois-Rivières (CA); Timothy Clayton Smith, The Woodlands, TX (US); Kenichi Miyagi, Conroe, TX (US)

(73) Assignee: KONGSBERG POWER PRODUCTS SYSTEMS I, INC., Willis, TX (US)

( * ) Notice: Subject to any disclaimer, the term of this patent is extended or adjusted under 35 U.S.C. 154(b) by 0 days.

(21) Appl. No.: 15/178,887

(22) Filed: Jun. 10, 2016

(51) Int. Cl.
*B60K 20/00* (2006.01)
*F16H 59/02* (2006.01)
*F16H 59/08* (2006.01)
*F16H 61/24* (2006.01)

(52) U.S. Cl.
CPC ..... *F16H 59/0204* (2013.01); *F16H 59/0217* (2013.01); *F16H 59/08* (2013.01); *F16H 61/24* (2013.01); *F16H 2059/081* (2013.01)

(58) Field of Classification Search
CPC .. F16H 59/0204; F16H 59/0217; F16H 59/08; F16H 61/24
See application file for complete search history.

(56) References Cited

U.S. PATENT DOCUMENTS 3,815,066 A  6/1974 Vinal
3,998,109 A  12/1976 O'Brien
4,334,130 A  6/1982 Beig
4,474,085 A  10/1984 DeVogelaere et al.
(Continued)

FOREIGN PATENT DOCUMENTS

CN  2908252 Y  6/2007
CN  202451814 U  9/2012
(Continued)

OTHER PUBLICATIONS

English language abstract and computer-generated English translation for JPH 0291444 extracted from espacenet.com database Oct. 3, 2016, 6 pages.
(Continued)

*Primary Examiner* — Zakaria Elahmadi
(74) *Attorney, Agent, or Firm* — Howard & Howard Attorneys PLLC

(57) ABSTRACT

A shifter assembly selects a first mode and a second mode of a transmission for a vehicle. The shifter assembly includes a housing and a shift lever movably coupled to the housing and pivotable relative to the housing. The shift lever includes a body and a cap defining an aperture and being coupled to the body. The cap is rotatable relative to the body between a first and a second orientations. The shift lever further includes a toggle device partially received by the cap in the aperture with at least a portion of the toggle device being moveably coupled to the body between a rest and a depressed positions. The shift lever further includes an element mounted to the toggle device and rotatable with the cap between the first and the second orientations. The shift lever further includes a sensor system configured to interact with the element to detect rotation of the cap between the first and the second orientations.

21 Claims, 13 Drawing Sheets

(56) References Cited

U.S. PATENT DOCUMENTS

| | | | |
|---|---|---|---|
| 5,025,901 A | 6/1991 | Kito et al. | |
| 5,309,744 A | 5/1994 | Kito et al. | |
| 5,345,836 A * | 9/1994 | Yokoyama | F16H 59/0217 200/61.88 |
| 5,581,058 A | 12/1996 | Javery et al. | |
| 5,791,197 A | 8/1998 | Rempinski et al. | |
| 6,114,640 A * | 9/2000 | Oddo | B60Q 1/1461 200/61.27 |
| 6,118,089 A | 9/2000 | Stewart et al. | |
| 6,151,977 A | 11/2000 | Menig et al. | |
| 6,172,312 B1 * | 1/2001 | Maranzano | B60Q 1/1469 200/61.28 |
| 6,246,127 B1 | 6/2001 | Weilbacher et al. | |
| 6,360,624 B1 | 3/2002 | Seldmaier et al. | |
| 6,462,289 B1 * | 10/2002 | Kubota | B60Q 1/1469 200/61.27 |
| 6,534,732 B2 | 3/2003 | Karasik et al. | |
| 6,548,770 B1 * | 4/2003 | Stewart | B60Q 1/1476 200/61.27 |
| 6,548,773 B2 | 4/2003 | Matsumoto et al. | |
| 6,624,364 B2 * | 9/2003 | Liburdi | B60Q 1/1469 200/61.27 |
| 6,624,366 B2 * | 9/2003 | Uchiyama | B60Q 1/1469 200/335 |
| 6,670,564 B2 * | 12/2003 | Naito | B60Q 1/1476 200/61.27 |
| 6,698,308 B2 | 3/2004 | Vogel et al. | |
| 6,945,349 B2 | 9/2005 | Coiling et al. | |
| 7,406,845 B2 | 8/2008 | Wise et al. | |
| 7,485,819 B2 * | 2/2009 | Reischl | B60Q 1/1476 200/61.27 |
| 7,603,924 B2 | 10/2009 | Mandou et al. | |
| 7,694,604 B2 | 4/2010 | Sickart et al. | |
| 9,334,949 B2 * | 5/2016 | Fett | F16H 59/08 |
| 9,530,585 B2 | 12/2016 | Korherr | |
| 2003/0038019 A1 * | 2/2003 | Wright | B60Q 1/1469 200/61.54 |
| 2011/0291777 A1 | 12/2011 | Stiltz et al. | |
| 2012/0143409 A1 * | 6/2012 | Curtis | B60W 50/082 701/22 |
| 2013/0284577 A1 | 10/2013 | Korherr | |
| 2014/0007726 A1 * | 1/2014 | Muraki | F16H 59/08 74/473.3 |
| 2015/0277480 A1 | 10/2015 | Altmann et al. | |

FOREIGN PATENT DOCUMENTS

| | | |
|---|---|---|
| CN | 204267706 U | 4/2015 |
| DE | 2534369 A1 | 2/1977 |
| DE | 199 05 627 A1 | 8/1999 |
| EP | 0629796 A2 | 12/1994 |
| EP | 0654381 A1 | 5/1995 |
| EP | 0734899 A2 | 10/1996 |
| EP | 0845389 A2 | 6/1998 |
| EP | 0 939 008 A2 | 9/1999 |
| EP | 0939008 A2 * | 9/1999 |
| EP | 1049605 A1 | 11/2000 |
| EP | 1074767 A1 | 2/2001 |
| EP | 1076193 A1 | 2/2001 |
| EP | 1164314 A1 | 12/2001 |
| EP | 1255064 A2 | 11/2002 |
| EP | 1355088 A1 | 10/2003 |
| EP | 1045172 B2 | 11/2003 |
| EP | 1394829 A2 | 3/2004 |
| EP | 1297272 B1 | 5/2004 |
| EP | 1591696 A1 | 11/2005 |
| EP | 1719934 A2 | 11/2006 |
| EP | 2159546 A2 | 3/2010 |
| EP | 2390893 A1 | 11/2011 |
| EP | 2621750 A1 | 8/2013 |
| EP | 2 891 835 A1 | 7/2015 |
| EP | 2911912 A1 | 9/2015 |
| FR | 2792085 A | 10/2000 |
| GB | 2327244 A | 1/1999 |
| JP | 0291444 A | 3/1990 |
| JP | H 07293679 A | 11/1995 |
| JP | H 08303585 A | 11/1996 |
| JP | 4806603 B2 | 11/2011 |
| KR | 101312178 B1 | 9/2013 |
| KR | 101488371 B1 | 1/2015 |
| WO | WO 1996023677 A1 | 8/1996 |
| WO | WO 01/47738 A1 | 7/2001 |
| WO | WO 2006083221 A1 | 8/2006 |
| WO | WO 2008074375 A1 | 6/2008 |
| WO | WO 2012056264 A1 | 5/2012 |
| WO | 2015083334 A1 | 6/2015 |
| WO | WO 2016/042405 A1 | 3/2016 |

OTHER PUBLICATIONS

English language abstract and computer-generated English translation for JPH 08303585 extracted from espacenet.com database Oct. 3, 2016, 8 pages.

English language abstract and computer-generated English translation for EP 0845389 extracted from espacenet.com database Oct. 3, 2016, 7 pages.

English language abstract and computer-generated English translation for EP 2159546 extracted from espacenet.com database Oct. 3, 2016, 9 pages.

English language abstract and computer-generated English translation for CN 2908252 extracted from espacenet.com database Oct. 3, 2016, 8 pages.

English language abstract and computer-generated English translation for KR 101488371 extracted from espacenet.com database Oct. 3, 2016, 8 pages.

English language abstract and computer-generated English translation for CN 202451814 extracted from espacenet.com database Oct. 10, 2016, 4 pages.

English language abstract for EP 1297272 extracted from espacenet.com database Oct. 10, 2016, 1 page.

English language abstract and computer-generated English translation for WO2008074375 extracted from espacenet.com database Oct. 10, 2016, 8 pages.

Computer-generated English translation for EP1255064 extracted from espacenet.com database Oct. 10, 2016, 13 pages.

English language abstract and computer-generated English translation for EP1164314 extracted from espacenet.com database Oct. 10, 2016, 6 pages.

English language abstract and computer-generated English translation for FR2792085 extracted from espacenet.com database Oct. 10, 2016, 10 pages.

English language abstract and computer-generated English translation for JP4806603 extracted from espacenet.com database Oct. 10, 2016, 16 pages.

English language abstract and computer-generated English translation for KR 101312178 extracted from espacenet.com database Oct. 3, 2016, 13 pages.

English language abstract and computer-generated English translation for CN 204267706 extracted from espacenet.com database Oct. 3, 2016, 6 pages.

English language abstract and computer-generated English translation for JPH 075293679 extracted from espacenet.com database Oct. 3, 2016, 8 pages.

Partial International Search Report for Application No. PCT/US2017/034411 dated Aug. 10, 2017, 3 pages.

English language abstract and computer-generated English language translation for DE 199 05 627 extracted from espacenet.com database on Aug. 28, 2017, 14 pages.

English language abstract and computer-generated English language translation for EP 0 939 008 extracted from espacenet.com database on Aug. 28, 2017, 13 pages.

English language abstract and computer-generated English language translation for DE2534369A1 extracted from espacenet.com database on Oct. 16, 2017, 9 pages.

(56) References Cited

OTHER PUBLICATIONS

English language abstract and computer-generated English language translation for WO2015083334A1 extracted from espacenet.com database on Oct. 16, 2017, 35 pages.
International Search Report for International Application No. PCT/US2017/034411 dated Oct. 9, 2017, 5 pages.

* cited by examiner

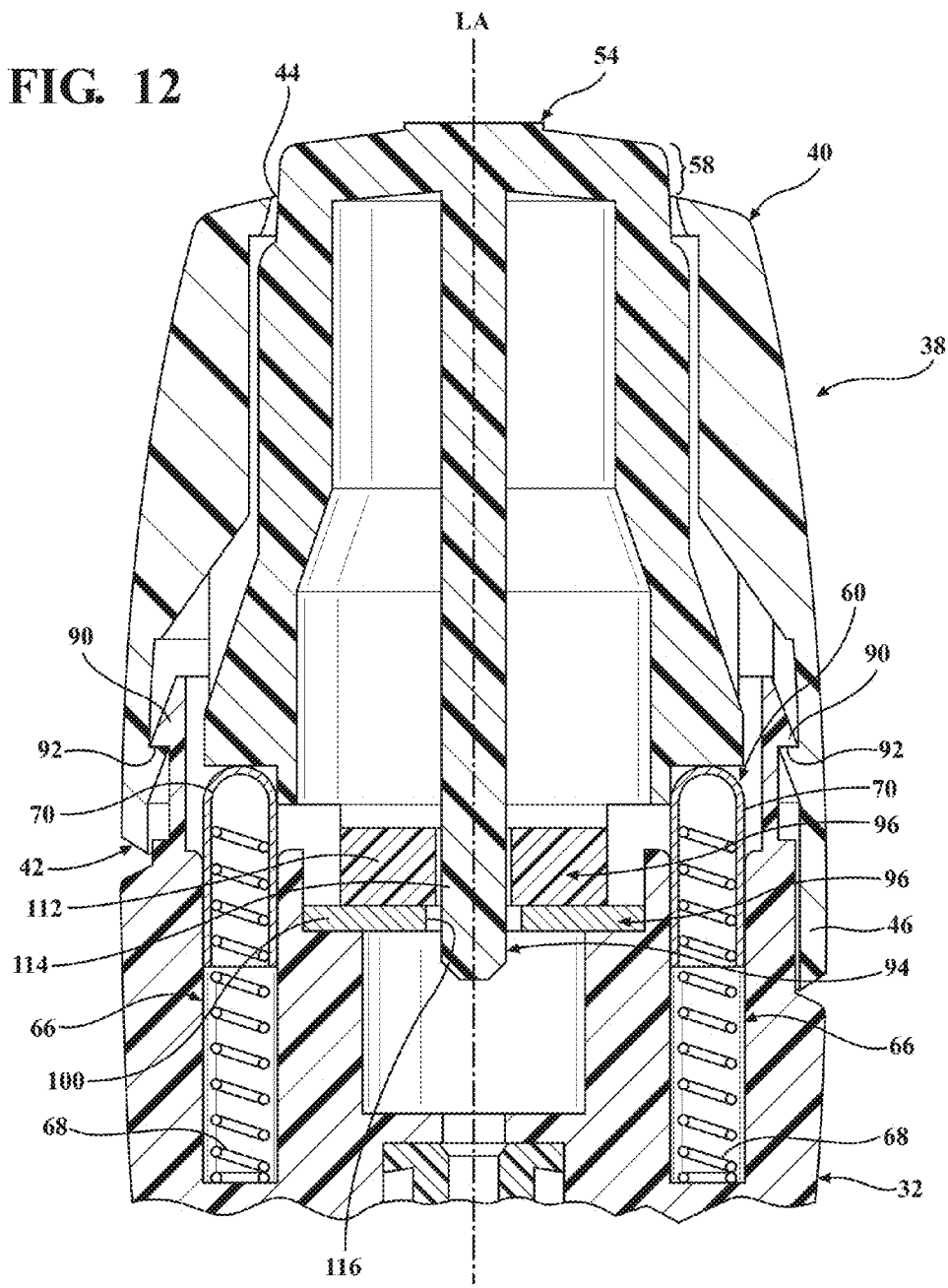

SHIFTER ASSEMBLY

FIELD OF THE INVENTION

The present invention generally relates to a shifter assembly for changing gear positions in a transmission of a vehicle.

BACKGROUND OF THE INVENTION

Shifter assemblies are used with transmissions in vehicles for changing gear positions of the transmission. For example, the shifter assemblies can be used to shift an automatic transmission into a plurality of automatic modes, such as Park, Reverse, Neutral, and Drive. The shifter assemblies can also be used to shift the automatic transmission into a manual mode akin to a manual transmission. Once in the manual mode, a driver may shift the automatic transmission from gear to gear manually.

A conventional shifter assembly includes a shifter operational along a first path between the plurality of automatic modes. The shifter is then moved into a second path for switching from the automatic mode to the manual mode. Once in the manual mode, the shifter is operational along the second path in a fore to aft manner to change gears within the automatic transmission manually. The second path is typically either parallel to and spaced from the first path or is transverse to the first path. In either case, the shifter must be moved laterally relative to the first path.

A different type of conventional shifter assembly includes a shifter that is mono-stable, meaning it returns to a common position after activation. These types of shifters are becoming more popular, especially where the shifter assembly is fully electronic.

There remains an opportunity to merge the automatic and manual modes found in a dual path shifter assembly with the functionality of a mono-stable shifter assembly.

SUMMARY OF THE INVENTION AND ADVANTAGES

A shifter assembly selects a first mode and a second mode of a transmission for a vehicle. The shifter assembly includes a housing. The shifter assembly further includes a shift lever movably coupled to the housing and pivotable relative to the housing. The shift lever includes a body. The shift lever further includes a cap defining an aperture and being coupled to the body. The cap is rotatable relative to the body between a first orientation for selecting the first mode and a second orientation for selecting the second mode of the transmission. The shift lever further includes a toggle device coupled to the cap for movement with the cap between the orientations and disposed in said aperture. At least a portion of the toggle device is moveably coupled to the cap between a rest position and a depressed position. A biasing member is disposed in the body and engages the toggle device to bias the toggle device toward a predetermined position. An element is mounted to the toggle device and rotatable with the toggle device and the cap between the first orientation and the second orientation. A sensor system is mounted in the body adjacent the toggle device and is configured to interact with the element to detect rotation of the cap between the first and the second orientations.

BRIEF DESCRIPTION OF THE DRAWINGS

Other advantages of the present invention will be readily appreciated, as the same becomes better understood by reference to the following detailed description when considered in connection with the accompanying drawings.

FIG. 12 is a fragmented cross-sectional side view of the shifter assembly of FIG. 11 with the cap in the second orientation and the button portion in the rest position.

DETAILED DESCRIPTION OF THE INVENTION

Figure 1:
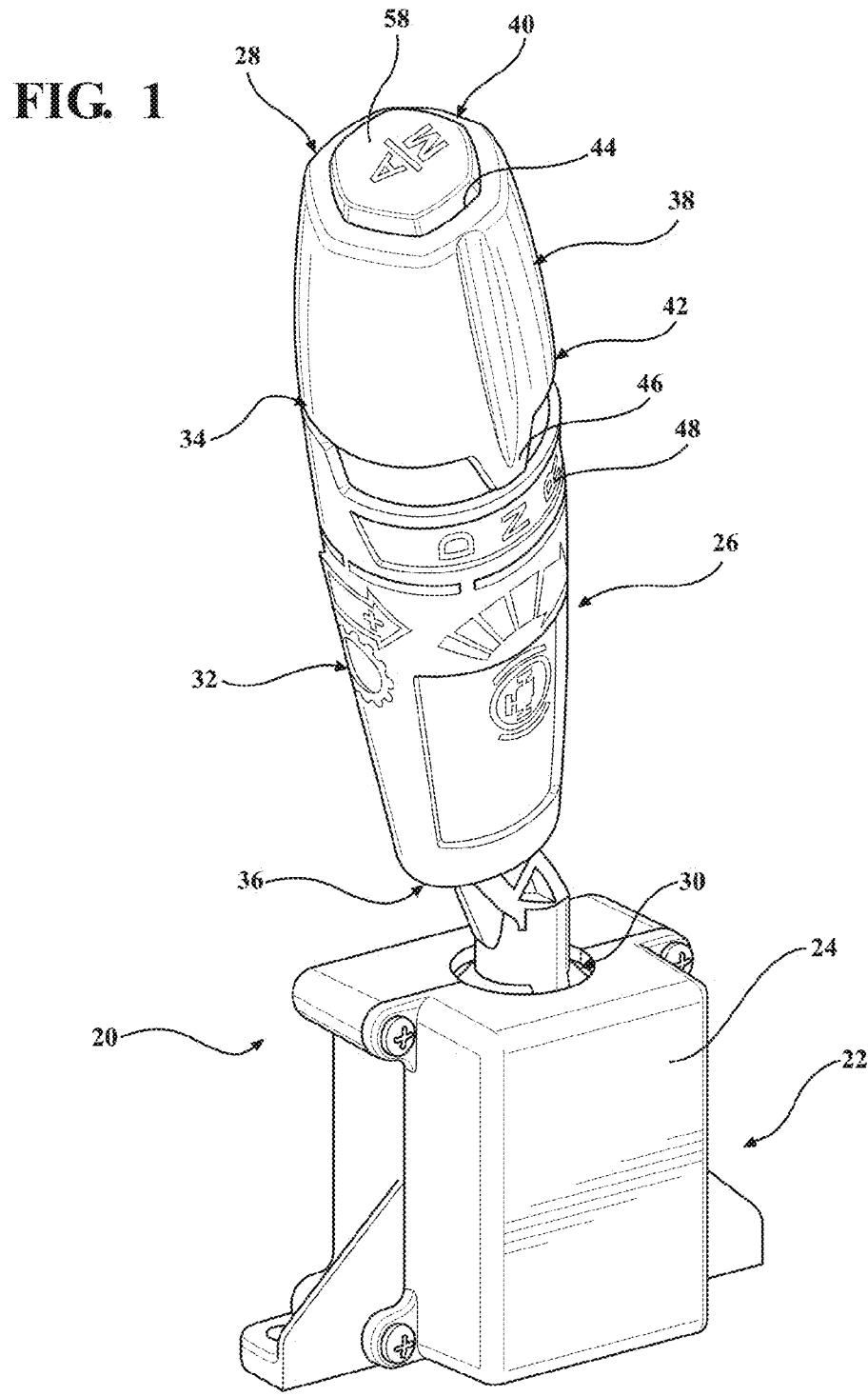
FIG. 1 is a perspective view of a shifter assembly.

Referring to the Figures, wherein like numerals indicate like or corresponding parts throughout the several views, a shifter assembly is generally shown at 20. The shifter assembly 20 is operated for selecting a plurality of modes of a transmission for a vehicle, such as a first mode and a second mode of the transmission. The plurality of modes of the transmission may relate to gear positions of the transmission ($1^{st}$ gear, $2^{nd}$ rear, $3^{rd}$ gear, etc.), states of the transmission (park, neutral, drive, reverse, etc.), or automatic and manual modes. Typically, the shifter assembly 20 is disposed within a center console of the vehicle. However, the shifter assembly 20 may be disposed in other places within the vehicle, such as the dashboard or the steering column.

With reference to FIGS. 1-2, 9 and 11, three different embodiments of the shifter assembly 20 having a housing 22 are shown. Common or like parts between the various embodiments of the invention are given common references numbers. The housing 22 has an exterior surface 24. Generally, the exterior surface 24 of the housing 22 is disposed in the center console of the vehicle. However, it is to be appreciated that the housing 22 may be disposed in other places within the vehicle, such as the dashboard or the steering column.

The shifter assembly 20 includes a shift lever 26 extending between a first shifter end 28 and a second shifter end 30, which is spaced from the first shifter end 28. The shift lever 26 defines a longitudinal axis LA between the first shifter end 28 and the second shifter end 30 of the shift lever 26. The shift lever 26 extends out of the housing 22 such that the first shifter end 28 of the shift lever 26 is exposed within the interior of the vehicle. The second shifter end 30 of the shift lever 26 is disposed within the housing 22 and is movably coupled to the housing 24. A vehicle operator utilizes the first shifter end 28 of the shift lever 26 to move the second shifter end 30 of the shift lever 26. The shift lever 26 is pivotable relative to the housing 22. In certain embodiments, such as the illustrated embodiments, the shift lever 26 is mono-stable relative to the housing. In other words, after pivoting the shift lever 26 relative to the housing 22 from a normal position to one or more activated positions, the shift lever 26 returns to the same normal position.

The shift lever 26 includes a body 32 extending between a first body end 34 and a second body end 36, which is spaced from the first body end 34. The body 32 is disposed between the first shifter end 28 and the second shifter end 30 of the shift lever 26 with the second body end 36 adjacent the exterior surface 24 of the housing 22. The first and second body ends 34, 36 generally extend along the longitudinal axis LA of the shift lever 26. The body 32 can be of any suitable configuration and can include any suitable indicia 48 as desired.

The shift lever 26 also includes a cap 38 coupled to the body 32 and extending between a first cap end 40 and a second cap end 42, which is spaced from the first cap end 40. The first cap end 40 is adjacent the first shifter end 28 of the shift lever 26 and the second cap end 42 is adjacent the first body end 34. The first and second cap ends 40, 42 generally extend along the longitudinal axis LA of the shift lever 26. The cap 38 defines an aperture 44 at the first cap end 40 and inline with the longitudinal axis LA of the shift lever 26. The cap 38 may also be of any suitable configuration.

The cap 38 is rotatable relative to the body 32 between a first orientation for selecting the first mode of the transmission and a second orientation for selecting the second mode of the transmission. It is to be appreciated that the cap 38 may be rotatable relative to the body 32 to additional orientations, such as a third orientation. The cap 38 includes an indicator extension 46 extending toward the body 32 to provide an indication of the orientation of the cap 38 relative to the body 32. The indicator extension 46 may be of any length, width or thickness as desired, so long as the orientation of the cap 38 relative to the body 32 can be understood.

Figure 5:
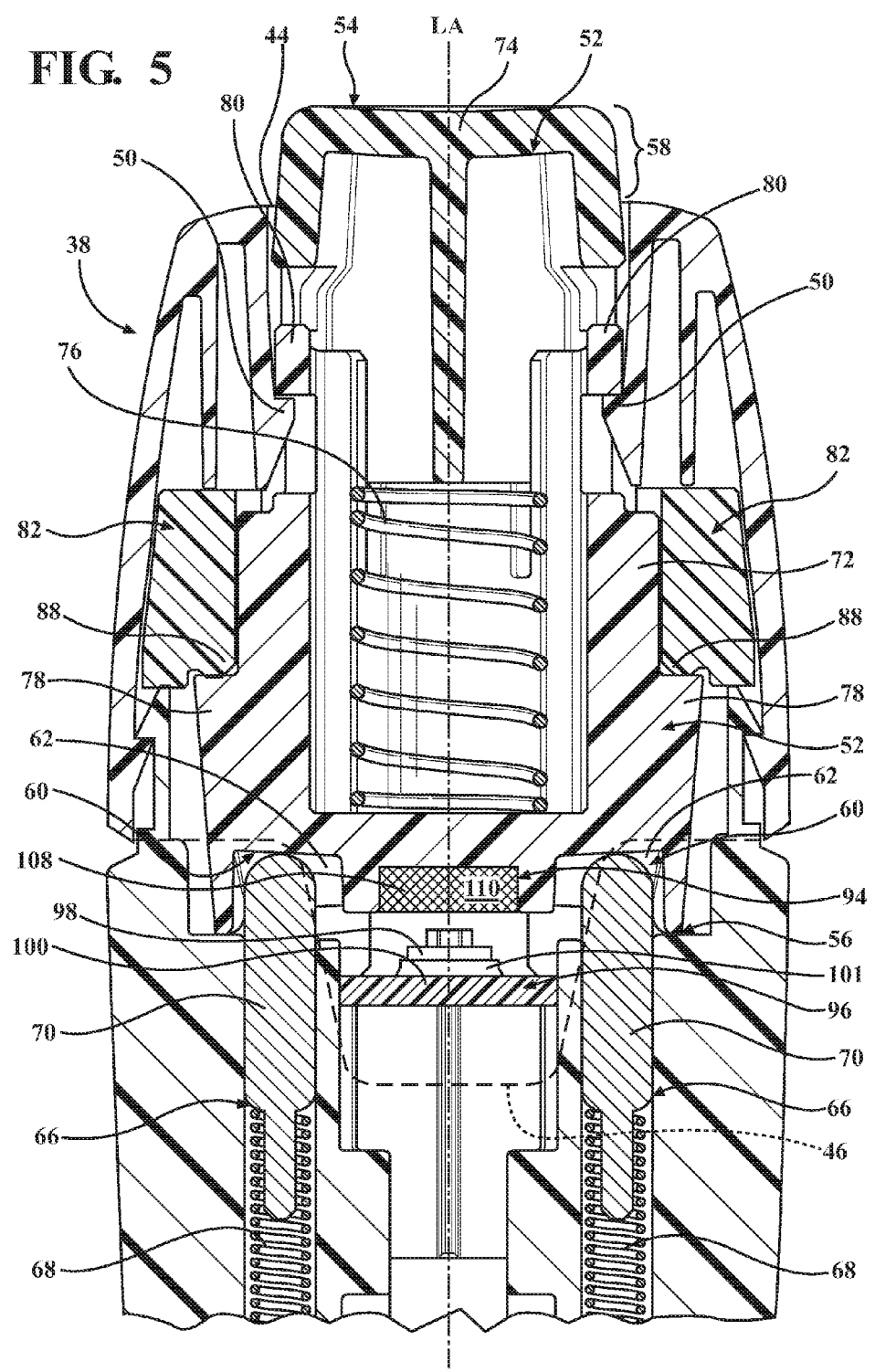
FIG. 5 is a fragmented cross-sectional side view of the shifter assembly of FIG. 1 with a cap in a first orientation and a button portion in a rest position.

Specifically, as shown, the body 32 may further include indicia 48 corresponding to the orientation of the cap 38 relative to the body 32 with the indicator extension 46 inline with the indicia 48. As shown in FIG. 5, for example, in certain embodiments, the cap 38 further includes a pair of retaining bulges 50 extending along the longitudinal axis LA toward the body 32 for coupling the cap 38 to the body 32.

Turning to FIGS. 2-5, 9-10 and 11-12, each shift lever 26 of the various embodiments further includes a toggle device 52 coupled to the cap 38 for movement with the cap 38 between the orientations. The toggle device 52 is also partially disposed in the aperture 44 of the cap 38. The toggle device 52 is moveably coupled to the cap 38 such that when the cap 38 rotates relative to the body 32, the toggle device 52 also rotates relative to the body 32. The toggle device 52 extends between a first toggle end 54 and a second toggle end 56, which is spaced from the first toggle end 54. The first and second toggle ends 54, 56 generally extend along the longitudinal axis LA of the shift lever 26. The toggle device 52 includes an exposed surface 58 adjacent the first toggle end 54. The exposed surface 58 of the toggle device 52 is configured to extend through the aperture 44 of the cap 38 toward the first shifter end 28. The toggle device 52 also includes a plurality of detent surfaces 60 facing the body 32 and adjacent the second toggle end 56. As shown in FIGS. 4A-4B, the detent surfaces 60 include a recess portion 62 and a raised portion 64.

Figure 7:
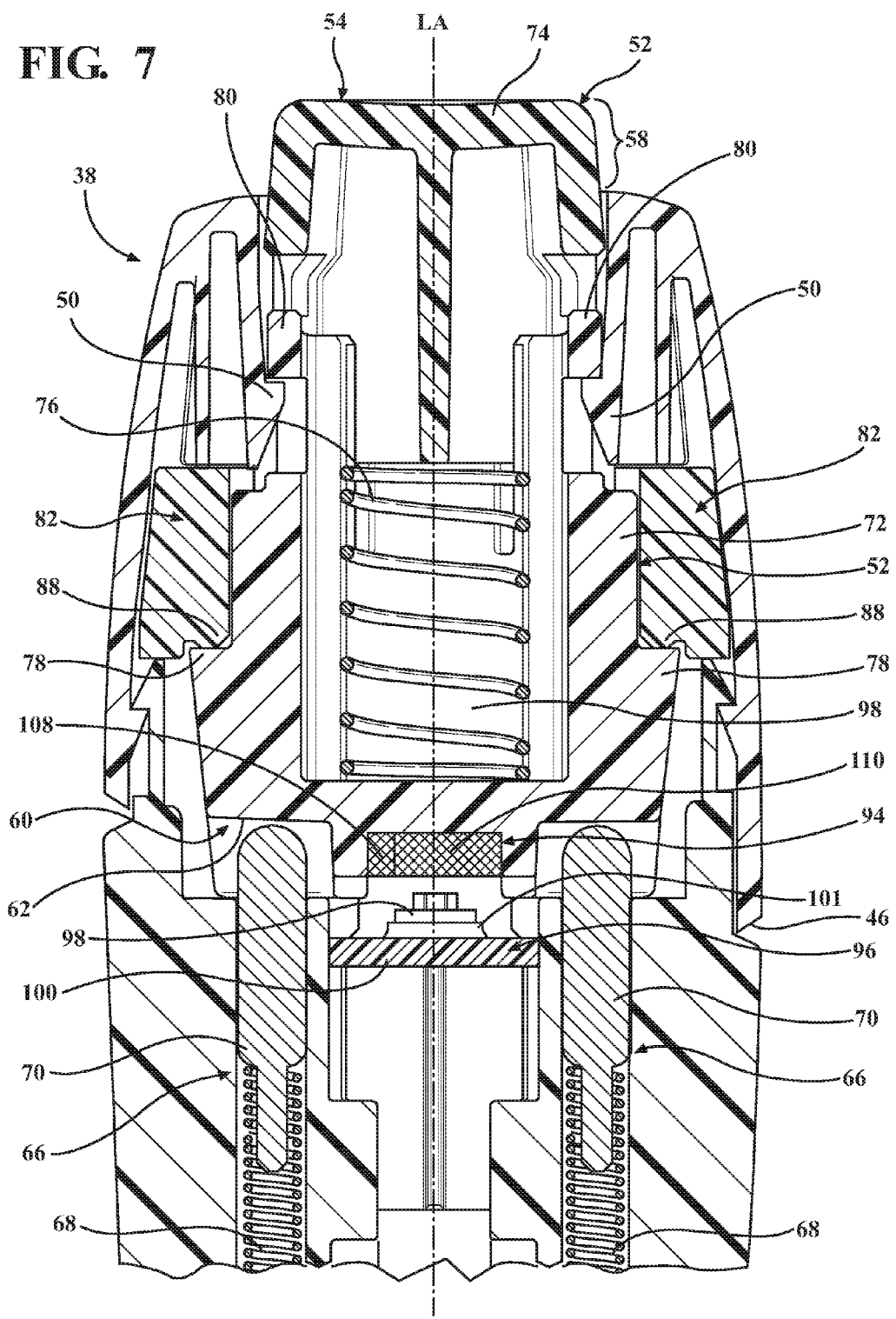
FIG. 7 is a fragmented cross-sectional side view of the shifter assembly of FIG. 1 with the cap in a second orientation and the button portion in the rest position.
Figure 8A:
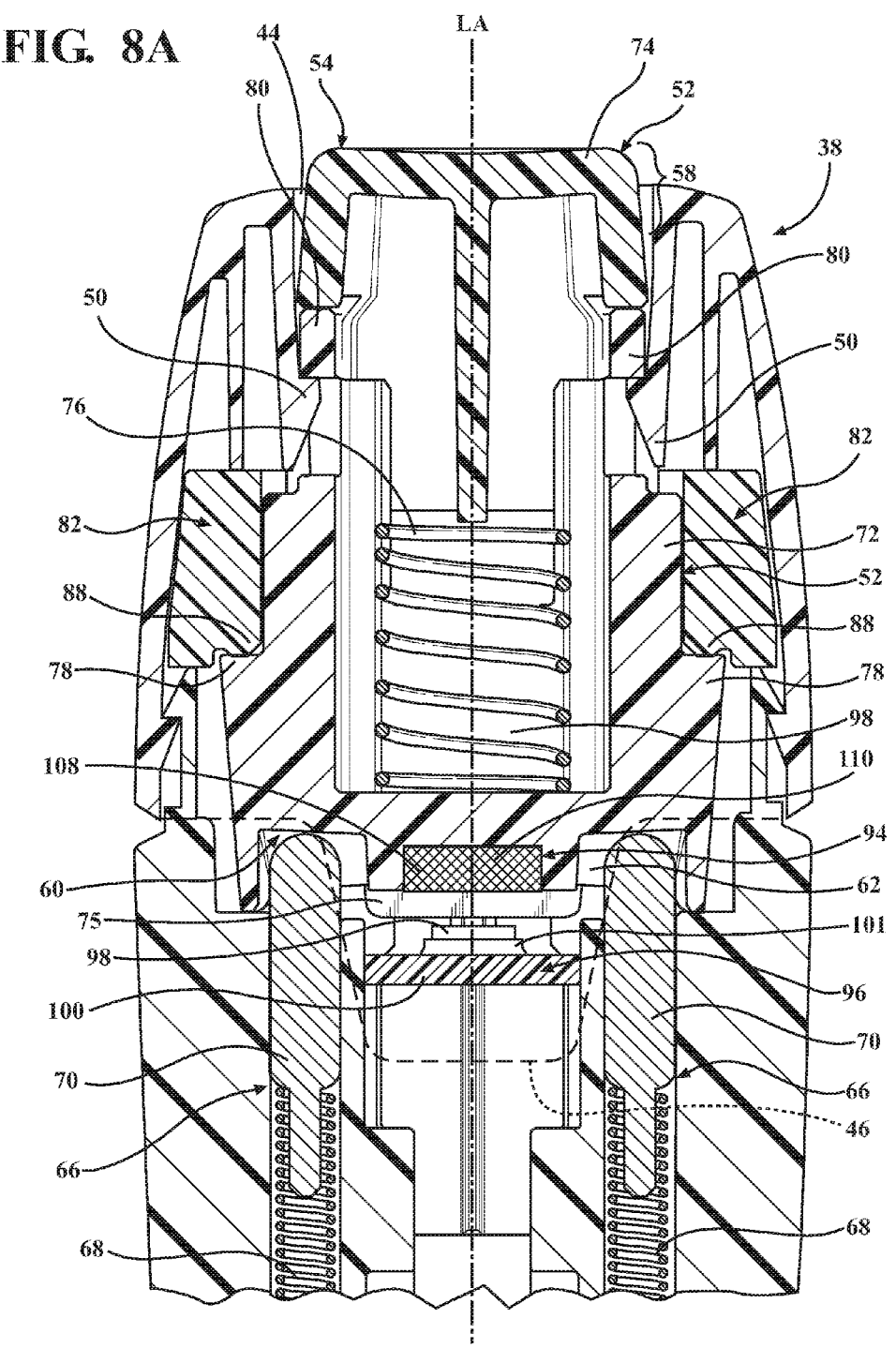
FIG. 8A is a fragmented cross-sectional side view of the shifter assembly of FIG. 1 with the cap in the first orientation and the button portion in a depressed position.
Figure 8B:
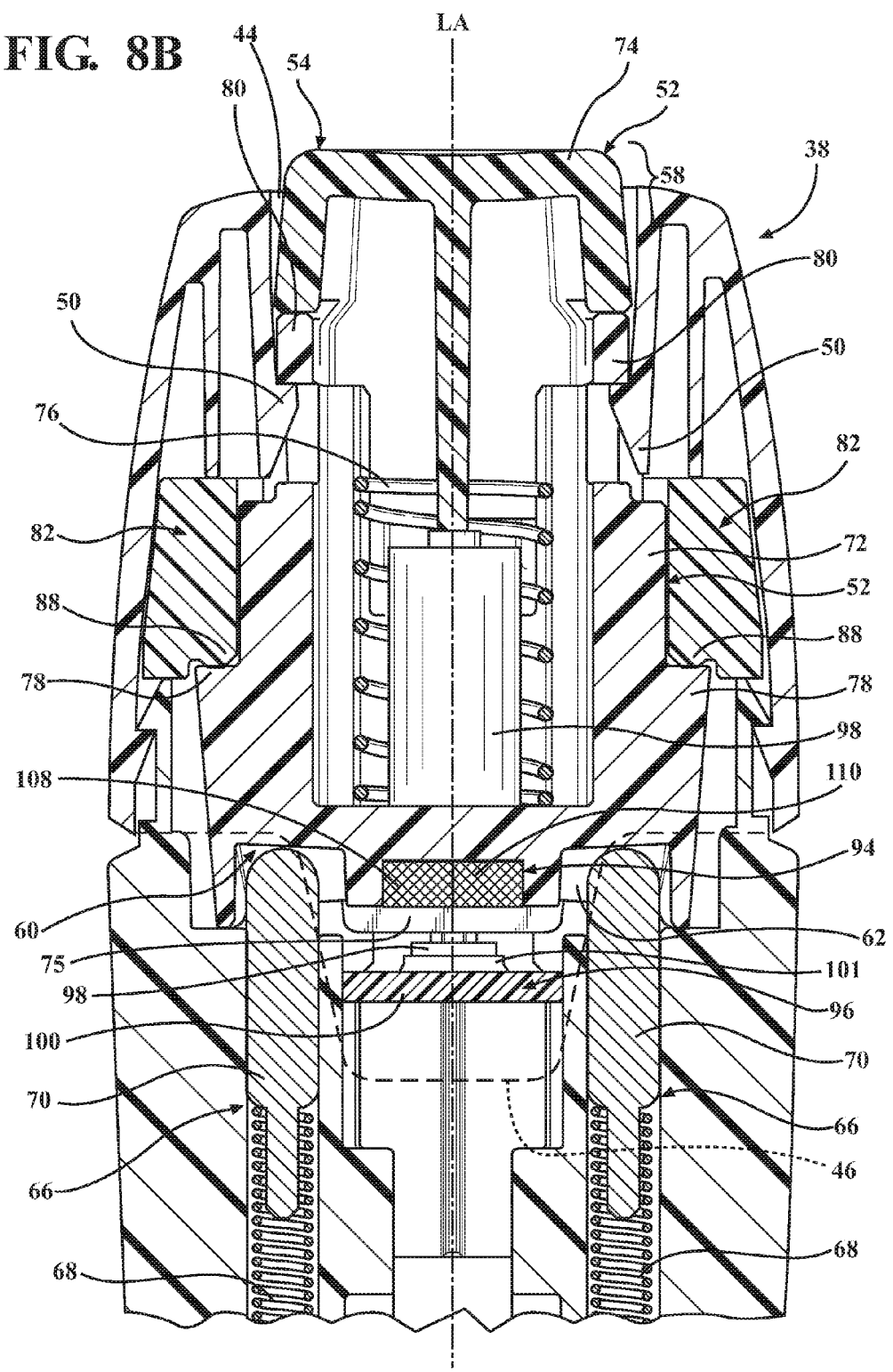
FIG. 8B is a fragmented cross-sectional side view of an alternative shifter assembly with a cap in the first orientation and a button portion in a depressed position.

At least a portion of the toggle device 52 is moveably coupled to the body 32 between a rest position and a depressed position. As discussed in greater detail below, in the embodiment of FIGS. 1-10, a portion of the toggle device 52 moves between the rest and depressed positions, while in the embodiment of FIGS. 11-12, the entire toggle device 52 moves between the rest and depressed positions. Specifically, the toggle device 52 (or a portion thereof) moves along the longitudinal axis LA of the shift lever 26 relative to the body 32 between the rest position and the depressed position. It is to be appreciated that the toggle device 52 may move along the longitudinal axis LA to additional positions. A vehicle operator utilizes the exposed surface 58 of the toggle device 52 to move the toggle device 52 along the longitudinal axis LA toward the body 32. As shown in FIGS. 5, 10 and 12, when the toggle device 52 is in the rest position, the exposed surface 58 is extended through the aperture 44 toward the first shifter end 28. As shown in FIGS. 8A and 8B, when a portion of the toggle device 52 is in the depressed position, a portion of the exposed surface 58 is disposed in the aperture 44. It is to be appreciated that certain aspects of the embodiments of the shifter assembly shown in FIGS. 9-10 and 11-12 operate in a similar manner to the embodiment of the shifter shown in FIGS. 1-8B such that a portion of the exposed surface 58 will likewise be disposed in the aperture 44.

The shift lever 26 further includes a biasing member 66 disposed in the body 32 and engaging the toggle device 52 to bias the toggle device 52 toward a predetermined position. In the embodiment of FIGS. 11-12, the predetermined position is the rest position. In the embodiment of FIGS. 1-10, the predetermined position is a rotational position of the toggle device 52. The biasing member 66 engages the toggle device 52 to bias the toggle device 52 toward the rest position. The biasing member 66 includes a spring portion 68 adjacent the second body end 36 of the body 32 and a plunger portion 70 adjacent the first body end 34. The plunger portion 70 engages the toggle device 52 to bias the toggle device 52 toward the predetermined position. In certain embodiments, the body 32 includes two biasing members 66. However, it is to be appreciated that the body 32 may include more than two biasing members 66 to bias the toggle device 52 toward the rest position.

Figure 6:
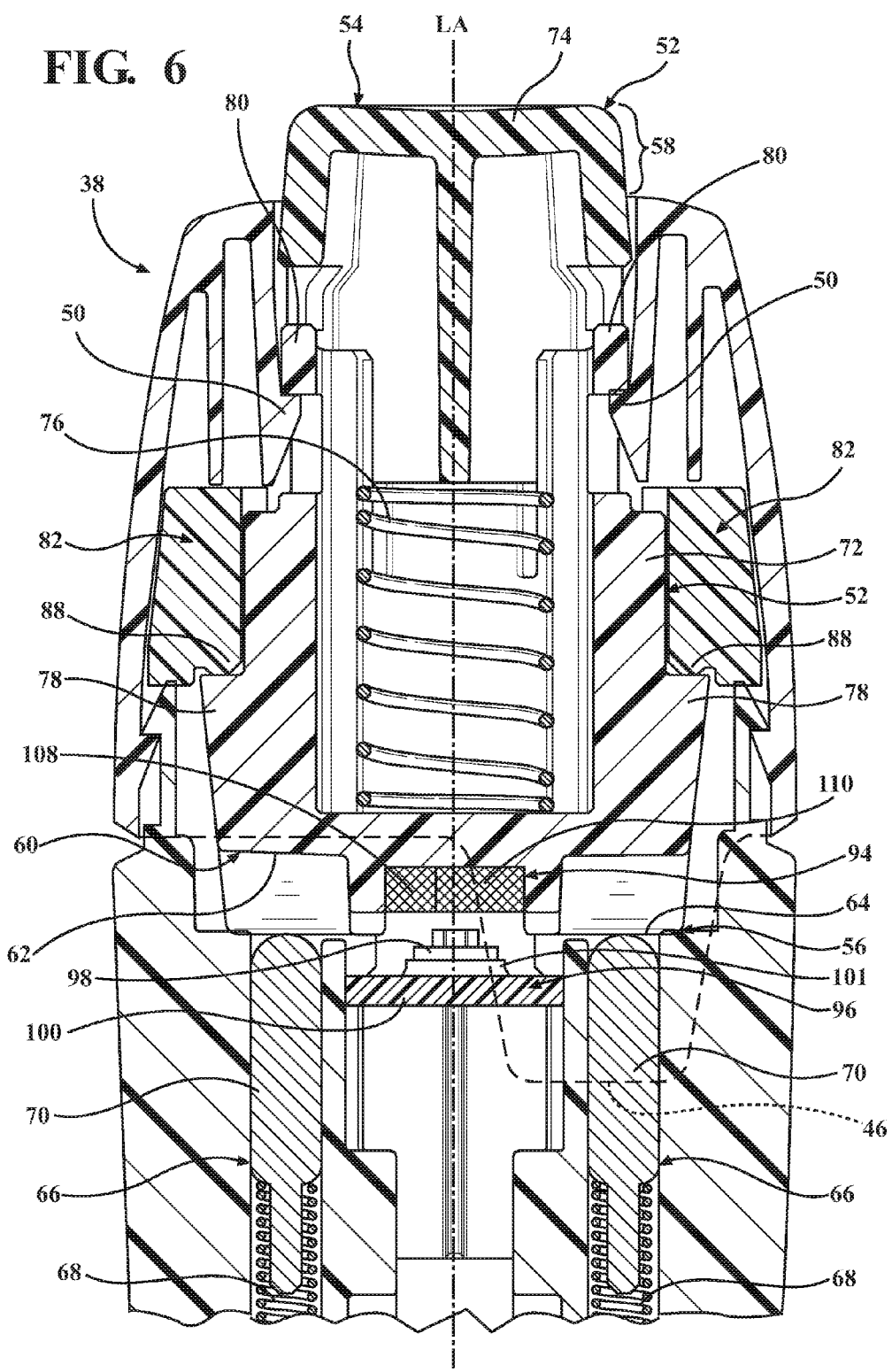
FIG. 6 is a fragmented cross-sectional side view of the shifter assembly of FIG. 1 with the cap in an intermittent orientation and the button portion in the rest position.

The biasing member 66 engages the detent surfaces 60 of the toggle device 52 to provide tactile feedback. As shown in FIGS. 5, 6, and 7, during rotation of the cap 38 and the toggle device 52, the biasing member 66 extends into the recess portions 62 of detent surfaces 60 and retracts with the raised portions 64 of the detent surfaces 60 to maintain engagement with the detent surfaces 60. As the biasing member 66 maintains this engagement with the detent surfaces 60 during rotation of the cap 38 and toggle device 52, tactile feedback is apparent to a vehicle operator.

Figure 2:
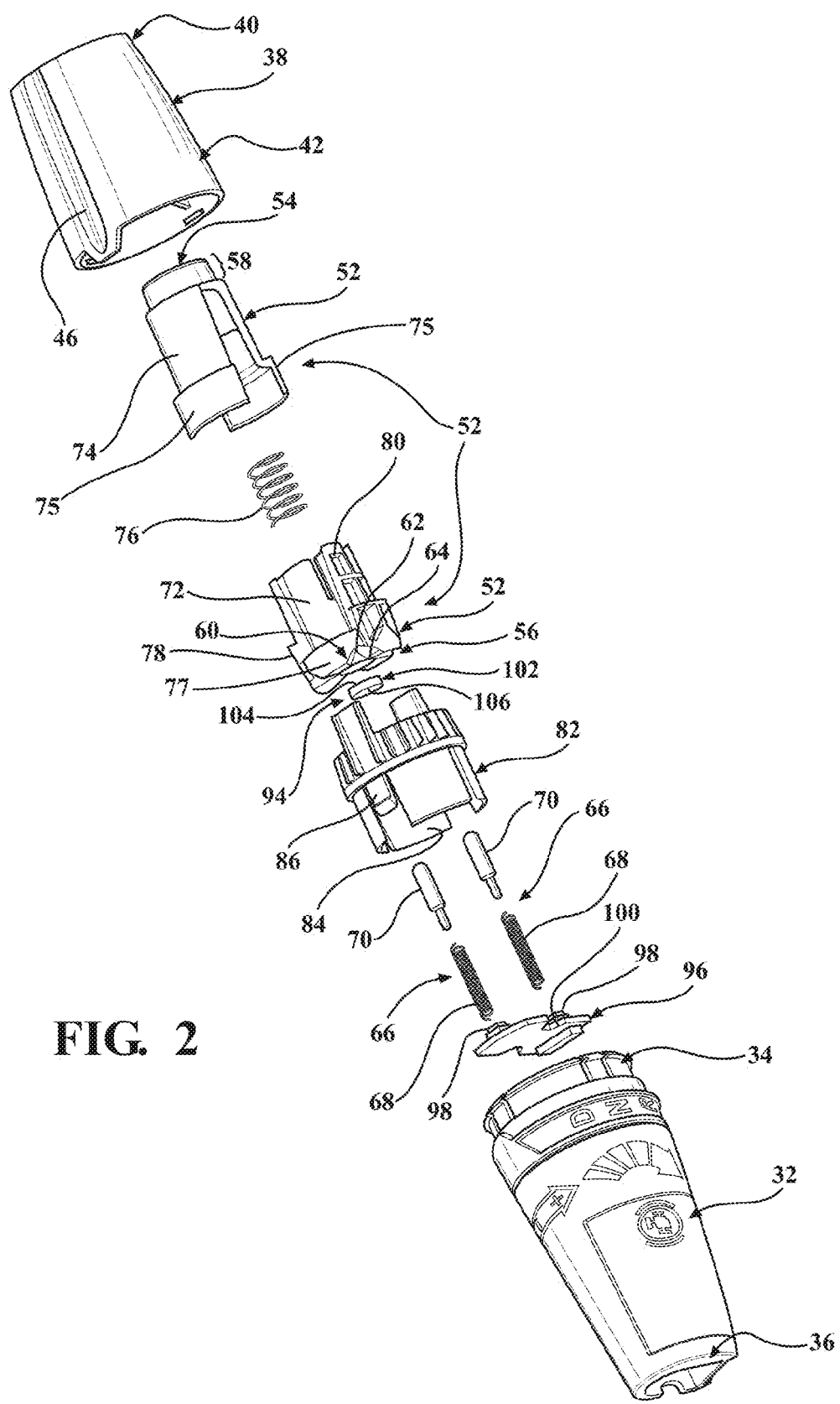
FIG. 2 is an exploded perspective view of the shifter assembly of FIG. 1.
Figure 3:
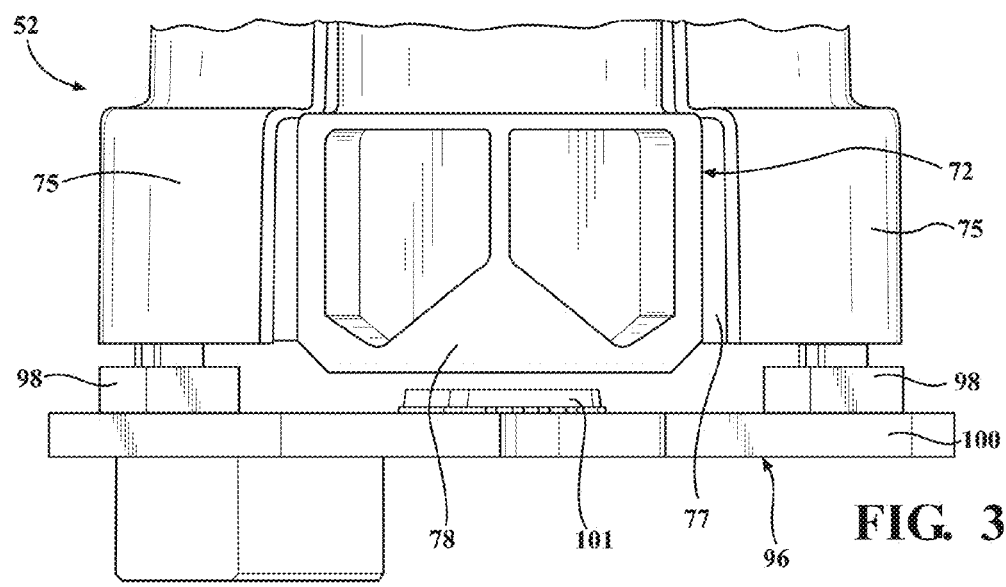
FIG. 3 is a fragmented side view of a toggle device and a sensor system of the shifter assembly of FIG. 2.
Figure 4A:
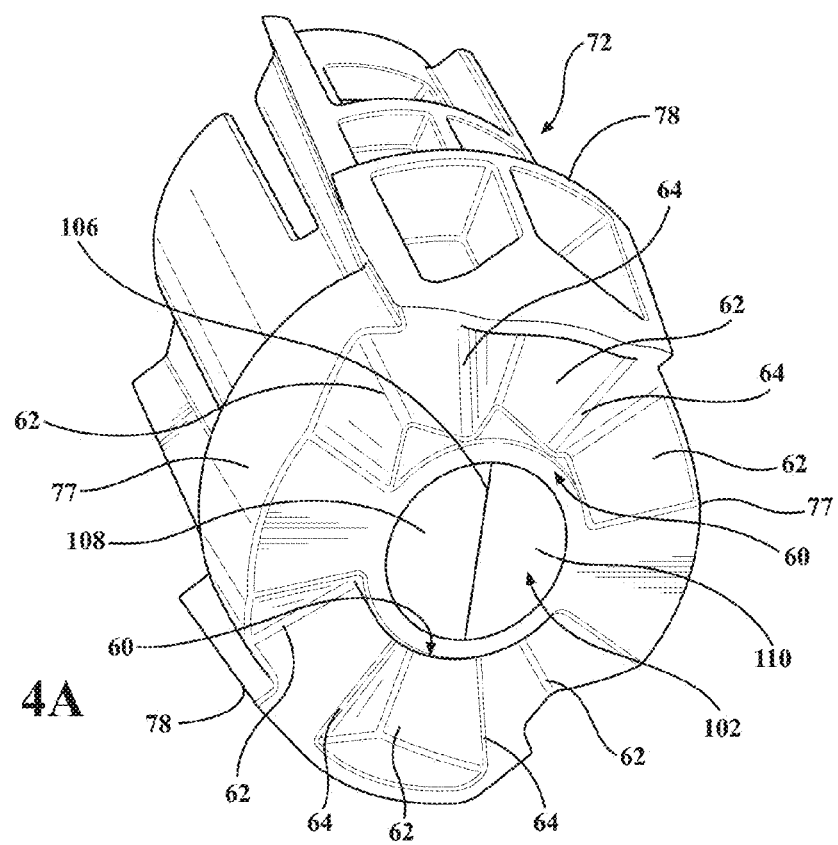
FIG. 4A is a perspective view of a rotary cam drive portion of the toggle device of FIG. 2.
Figure 4B:
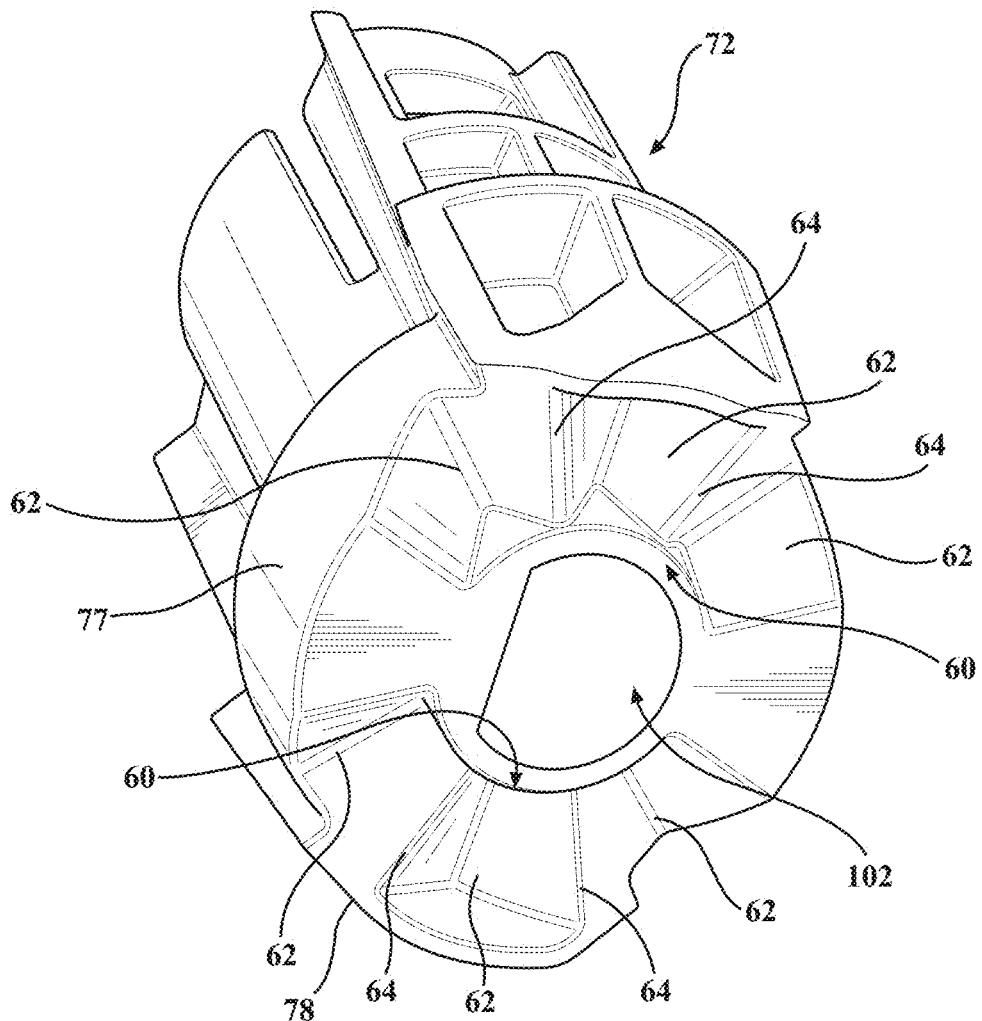
FIG. 4B is a perspective view of an alternative rotary cam drive portion.

With reference to the embodiments shown in FIGS. 1-10, the toggle device 52 is formed of multiple components. As shown, the toggle device 52 includes a rotary cam drive portion 72 and a button portion 74. A spring 76 is disposed between the rotary cam drive portion 72 and the button portion 74 to bias the button portion 74 toward the rest position of the toggle device 52. The button portion 74 is received by the cap 38 in the aperture 44 of the cap 38 with the button portion 74 including the exposed surface 58. A vehicle operator utilizes the exposed surface 58 of the button portion 74 of the toggle device 52 to move the button portion 74 along the longitudinal axis LA toward the body 32. As shown in these embodiments, the button portion 74 includes at least one, and preferably two, legs 75 that extend from the exposed surface 58 at the first toggle end 54 toward the second toggle end 56 about the rotary cam drive portion 72. Even more preferably, the legs 75 are separated from each other and are cantilevered off of the exposed surface 58 at the first toggle end 54. Further, as shown in FIGS. 3-4B, the rotary cam drive portion 72 has at least, and preferably two, grooves 77 for receiving the legs 75. The legs 75 of the button portion 74 slide within the grooves 77 of the rotary cam drive portion 72 during the movement of the button portion 74 between the rest and depressed positions.

As shown in FIGS. 2 and 4-10, the rotary cam drive portion 72 is adjacent the body 32 and includes the detent surfaces 60. The rotary cam drive portion 72 includes a pair of protrusions 78 extending laterally relative to the longitudinal axis LA from the rotary cam drive portion 72 for coupling the rotary cam drive portion 72 to the body 32. The rotary cam drive portion 72 also includes a pair of locking bulges 80 extending along the longitudinal axis LA toward the cap 38. The locking bulges 80 cooperate with retaining bulges 50 of the cap 38 to couple the cap 38 to the body 32. The cap 38 is coupled to the rotary cam drive portion 72 such that the cap 38 is coupled to the body 32 while permitting the rotation of the cap 38 relative to the body 32. During rotation of the cap 38, both the rotary cam drive portion 72 and the button portion 74 rotate. During movement of the portion of the toggle device 52 along the longitudinal axis LA, the button portion 74 moves along the longitudinal axis LA while the rotary cam drive portion 72 remains in position along the longitudinal axis LA.

As shown in FIGS. 2, 5-10, the shift lever 26 further includes a retainer 82 disposed between the cap 38 and the body 32 with the retainer 82 coupled to the body 32. The retainer 82 extends along the longitudinal axis LA and defines an opening 84 also extending along the longitudinal axis LA with the opening 84 configured to receive the rotary cam drive portion 72. The retainer 82 is configured to retain the rotary cam drive portion 72 of the toggle device 52 between the body 32 and the cap 38. The retainer 82 includes a pair of locking tabs 86 extending along the longitudinal axis LA toward the body 32, which are configured to couple the retainer 82 to the body 32 adjacent the first body end 34 of the body 32. The retainer 82 includes a shelf 88 extending about a periphery of the retainer 82 on an interior surface of the retainer 82. The shelf 88 of the retainer 82 is configured to cooperate with the protrusions 78 of the rotary cam drive portion 72 to couple rotary cam drive portion 72 to the body 32 such that the rotary cam drive portion 72 remains in position along the longitudinal axis LA.

With reference to the embodiment shown in FIGS. 11-12, the toggle device 52 is a unified component including the exposed surface 58 and the detent surfaces 60. The exposed surface 58 of the toggle device 52 is adjacent the first toggle end 52 and the detent surfaces 60 are disposed adjacent the second toggle end 54. During rotation of the cap 38, both the exposed surface 58 and the detent surfaces 60 rotate. During movement of the toggle device 52 along the longitudinal axis LA, both the exposed surface 58 and the detent surfaces 60 move along the longitudinal axis LA.

In all of the embodiments, the body 32 has a first locking member 90 and the cap 38 has a second locking member 92. The first and the second locking members engaged 90, 92 to each other such that the cap 38 is coupled to the body 32 while permitting the rotation of the cap 38.

With continued reference to all of the embodiments, the shift lever 26 also includes an element 94 mounted to the toggle device 52. The element 94 extends from the second toggle end 56 toward the body 32. The element 94 is generally inline with the longitudinal axis LA. In embodiments wherein the toggle device 52 includes the rotary cam drive portion 72, the element 94 is mounted to the rotary cam drive portion 72 and extends from the second toggle end 56 toward the body 32. In embodiments wherein the toggle device 52 is the unified component, the element 94 is mounted to the toggle device 52 and extends from the second toggle end 56 toward the body 32.

The element 94 is rotatable with the toggle device 52 and the cap 38 between the first orientation and the second orientation. In embodiments wherein the toggle device 52 includes the rotary cam drive portion 72 and during rotation of the cap 38, the rotary cam drive portion 72 and the element 94 rotate. In embodiments wherein the toggle device 52 is the unified component and during rotation of the cap 38, the toggle device 52 and the element 94 rotate.

The shift lever 26 also includes a sensor system 96 mounted in the body 32 adjacent the toggle device 52. The sensor system 96 is disposed along the longitudinal axis LA. While the sensor system 96 includes sensors mounted in the body 32 adjacent the toggle device 52, the sensor system 96 may also include sensors in other locations within the shift lever 26, such as between the button portion 74 and the rotary cam drive portion 72 of the toggle device 52. The sensor system 96 may include any type of sensor or sensors for detecting rotation of the cap 38 between the first and said second orientations, detecting movement of the toggle device 52 between the rest position and the depressed position, or both. Examples of suitable sensors include hall effect sensors, potentiometers, switches, or combinations thereof Preferably, the sensor system 96 includes any type of suitable support structure 100 for the sensors, such as a PCB. The support structure 100 can be of any configuration is generally intersects the longitudinal axis LA.

The sensor system 96 is configured to interact with the element 94 to detect rotation of the cap 38 between the first and the second orientations. The interaction between the element 94 and the sensor system 96 may be a physical interaction, an electrical interaction, a magnetic interaction, an electromagnetic interaction, or combinations thereof In certain embodiments, the sensor system 96 is configured to output a first voltage when the cap 38 is in the first orientation for selecting the first mode of the transmission and configured to output a second voltage different than the first voltage when the cap 38 is in the second orientation for selecting the second mode of the transmission. In embodiments wherein the cap 38 is rotatable relative to the body 32 to a third rotation, the sensor system 96 is configured to output a third voltage different than the first and second voltages when the cap 38 is in the third orientation for selecting a third mode of the transmission. It is to be appreciated that the sensor system 96 may be configured to output a variety of different voltages corresponding to the number of orientation that the cap 38 is rotatable to.

In other embodiments, the sensor system 96 is configured to output a fourth voltage when at least a portion of the toggle device 52 is in the rest position and a fifth voltage when at least the portion of the toggle device 52 is in the depressed position with the fourth and fifth voltages different than each other and different than the first, second, and third voltages. It is to be appreciated that the sensor system 96 may be configured to output a variety of different voltages corresponding to any intervening positions between the rest position and the depressed position of the toggle device 52.

As shown in the embodiment of FIGS. 1-8A, the sensor system 96 includes a switch 98 disposed on the support structure 100. The switch 98 could be of any suitable configuration. The switch 98 is configured to detect the movement of at least the portion of the toggle device 52 between the rest position and the depressed position. It is to be appreciated that the switch may be configured to detect movement of the portion of the toggle device 52 to any intervening position between the rest position and the depressed position of the portion of the toggle device 52. As shown in FIGS. 2, 3 and 8A, the switch 98 is a mechanical switch engaged by the legs 75 of the button portion 74 when the button portion 74 moves to the depressed position. As specifically shown, there is one switch 98 for each leg 75. It is to be appreciated that there may be any number of switches 98 and the switch 98 could be of any contact or non-contact design actuated by any suitable configuration of the button portion 74.

Figure 9:
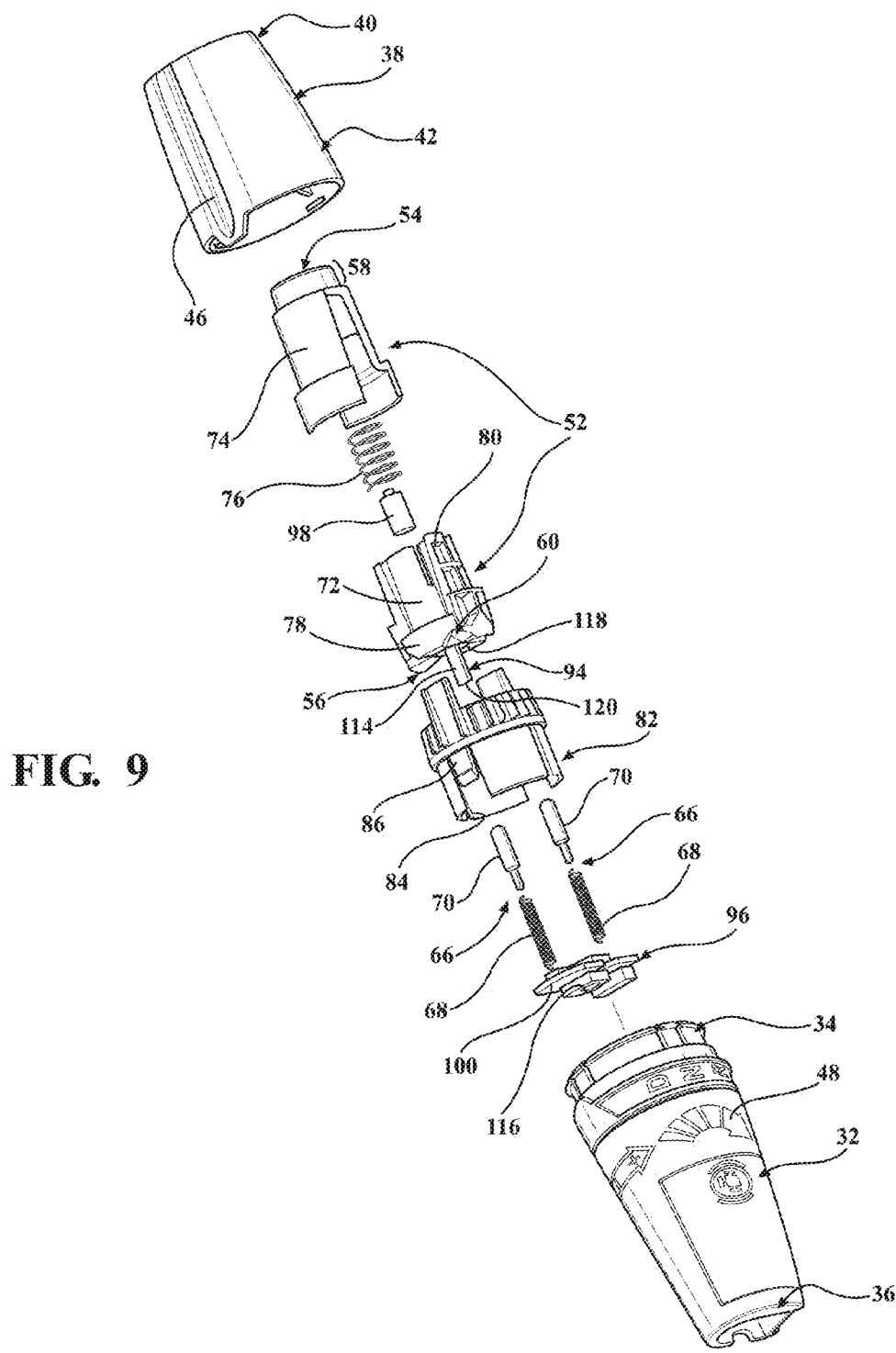
FIG. 9 is an exploded perspective view of an alternate embodiment of the shifter assembly.
Figure 10:
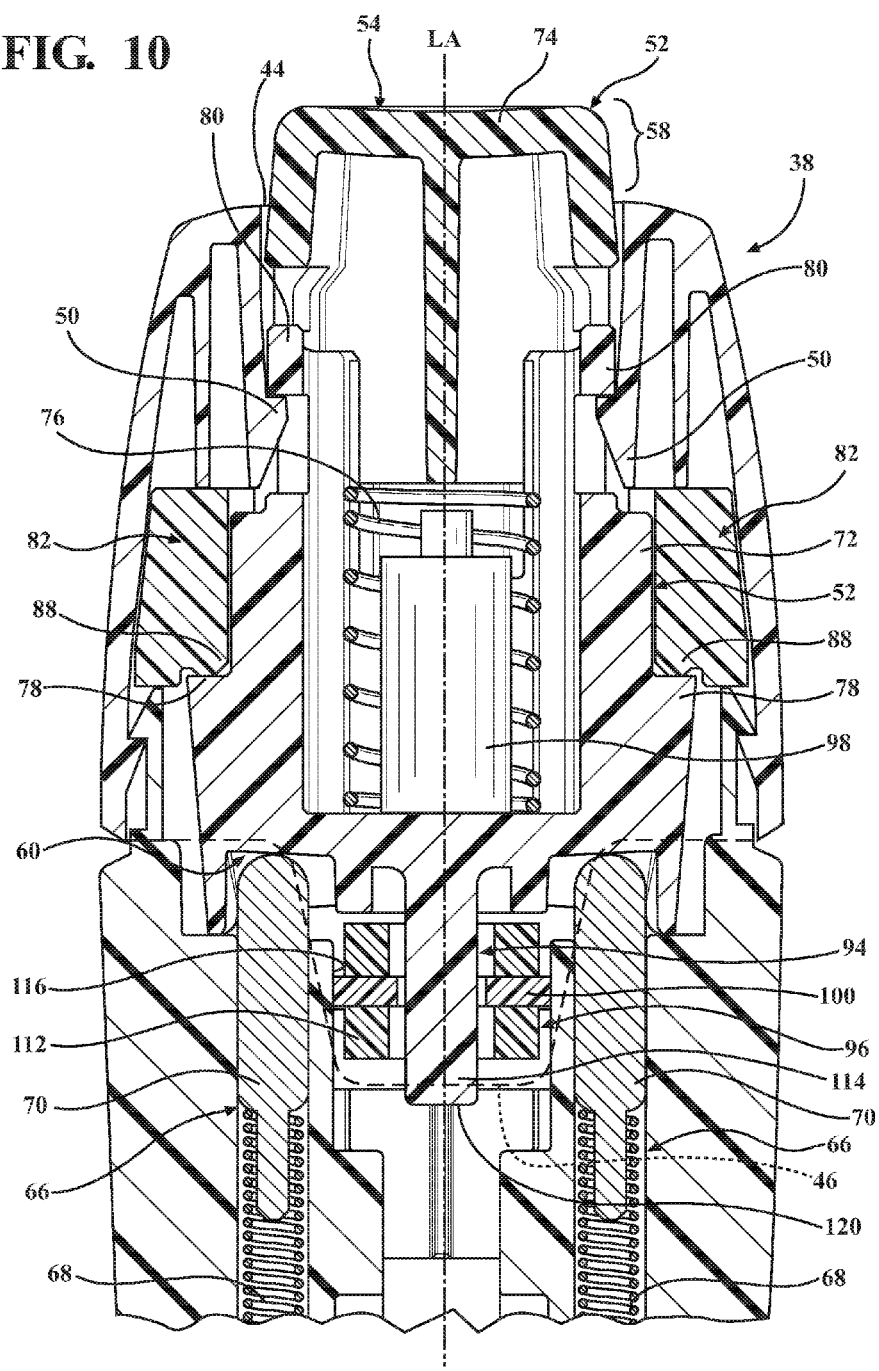
FIG. 10 is a cross-sectional view of the shifter assembly of FIG. 9 with the cap in the first orientation and the button portion in the rest position.
Figure 11:
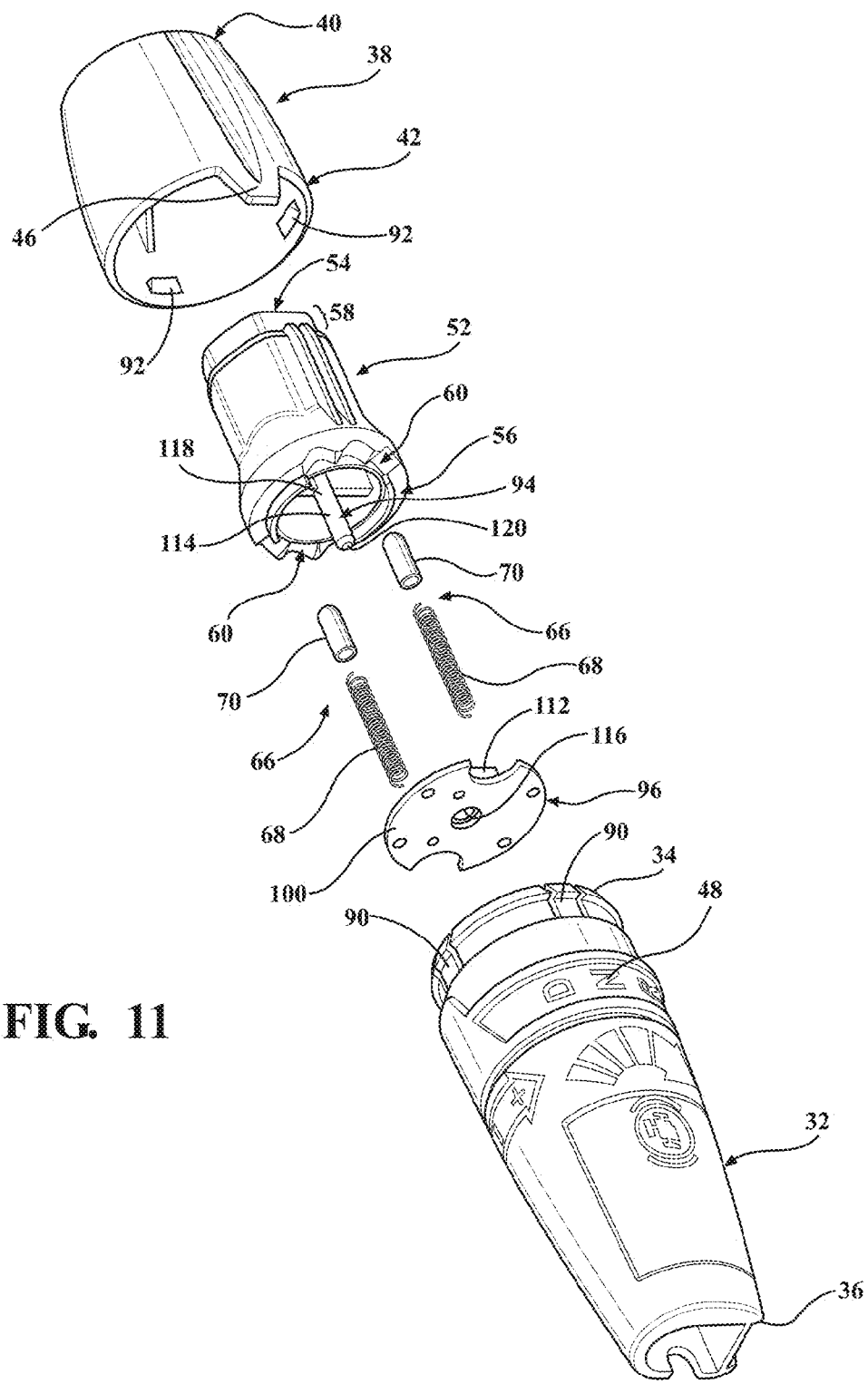
FIG. 11 is an exploded perspective view of another alternative embodiment of the shifter assembly.

With reference to the embodiments shown in FIGS. 8B and 9-10, the sensor system 96 includes a switch 98 disposed between the button portion 74 of the toggle device 52 and the rotary cam drive portion 72 of the toggle device 52. As shown in FIG. 8B, there could be redundant switches 98 in alternative positions. The switch is schematically shown and could be of any suitable configuration. The switch 98 is configured to detect the movement of at least the portion of the toggle device 52 between the rest position and the depressed position. It is to be appreciated that the switch may be configured to detect movement of the portion of the toggle device 52 to any intervening position between the rest position and the depressed position of the portion of the toggle device 52.

As shown in FIGS. 2, 3 and 5-8B, the sensor system 96 includes a hall effect sensor 101. As shown, the hall effect sensor 101 is disposed on the support structure 100 in any suitable manner and many be of any suitable configuration. In this embodiment, the element 94 includes a magnet 102. The magnet 102 is rotatable with the cap 38 relative to the hall effect sensor 101 such that the hall effect sensor 101 outputs the first voltage when the cap 38 is in the first orientation and outputs the second voltage when the cap 38 is in the second orientation. As shown in FIG. 4A, the magnet 102 may have a cylindrical configuration and have a first face 104 and a second face 106 spaced from the first face 104 with the first and the second faces 104, 106 disposed along the longitudinal axis LA. The magnet 102 of FIG. 4A may have a first side 108 and a second side 110 extending along the longitudinal axis LA from the first face 104 to the second face 106. The magnet 102 of FIG. 4A may also define an N-pole on the first side 108 and an S-pole on the second side 110 with the N-pole and S-pole defining a magnetic field. It is to be appreciated that the magnet 102 may be of any suitable configuration. For example, the magnet 102 could have a D-shaped configuration as shown in FIG. 4B.

In one embodiment, the sensor system 96 includes the hall effect sensor 101 and the switch 98. The hall effect sensor 101 detects rotation of the cap 38 between the first and the second orientations. The switch 98 detects movement of at least the portion of the toggle device 52 between the rest position and the depressed position. Rotation of the magnet 102 relative to the hall effect sensor 101 results in a variable voltage output from the hall effect sensor 101 due to the change in the magnetic field. As such, when the cap 38 is in the first orientation, the hall effect sensor 101 outputs the first voltage and when the cap 38 is in the second orientation, the hall effect sensor 101 outputs the second voltage.

In another embodiment, the hall effect sensor 101 of the sensor system 96 detects rotation of the cap 38 between the first and the second orientations and detects movement of at least the portion of the toggle device 52 between the rest position and the depressed position. Rotation of the magnet 102 relative to the hall effect sensor 101 results in a variable voltage output from the hall effect sensor 101 due to the change in the magnetic field. As such, when the cap 38 is in the first orientation, the hall effect sensor 101 outputs the first voltage and when the cap 38 is in the second orientation, the hall effect sensor 101 outputs the second voltage. Movement of the magnet 102 along the longitudinal axis LA results in a variable voltage output from the hall effect sensor 101 due to the change in the magnetic field. As such, when at least the portion of the toggle device 52 is in the rest position, the hall effect sensor 101 outputs the fourth voltage and when at least the portion of the toggle device 52 is in the depressed position, the hall effect sensor 101 outputs the fifth voltage.

The sensor system 96 could also, or alternatively, includes a potentiometer 112. The potentiometer is specifically shown in the embodiments of the shifter in FIGS. 9-12. As shown, the potentiometer 112 is disposed on the support structure 100 and/or is integrated with the support structure 100. In these embodiments, the element 94 includes a resistance element 114. The resistance element 114 is rotatable with the cap 38 relative to the potentiometer 112 such that the potentiometer 112 outputs the first voltage when the cap 38 is in the first orientation and outputs the second voltage when the cap 38 is in the second orientation. The potentiometer 112 defines an orifice 116 with the resistance element 114 received by the orifice 116 to detect rotation of the resistance element 114 relative to the potentiometer 112. The resistance element 114 may have a cylindrical configuration and have a first resistance element end and a second resistance element end spaced from the first resistance element end with the first and the second resistance element ends disposed along the longitudinal axis LA. The first resistance element end is adjacent the toggle device 52 and the second resistance element end faces the body 32. The resistance element 114 may define a circumference extending about the longitudinal axis LA between the first resistance element end and the second resistance element end. The resistance element 114 may have a variable electrical resistivity ($\Omega \cdot m$) extending along the circumference of the resistance element 114, may have a variable electrical resistivity ($\Omega \cdot m$) extending between the first and the second resistance element ends, or both.

The embodiment of FIGS. 9-10 has the sensor system 96 with the potentiometer 112 and the switch 98. The potentiometer 112 detects rotation of the cap 38 between the first and the second orientations. The switch 98 detects movement of at least a portion of the toggle device 52 between the rest position and the depressed position. In this embodiment, the resistance element 114 has a variable electrical resistivity ($\Omega \cdot m$) extending along the circumference of the resistance element 114. Rotation of the resistance element 114 relative to the potentiometer 112 results in a variable voltage output from the potentiometer 112 due to the change in the electrical resistivity ($\Omega \cdot m$). As such, when the cap 38 is in the first orientation, the potentiometer 112 outputs the first voltage and when the cap 38 is in the second orientation, the potentiometer 112 outputs the second voltage.

In the embodiment shown in FIGS. 11-12, the potentiometer 112 of the sensor system 96 detects rotation of the cap 38 between the first and the second orientations and detects movement of at least a portion of the toggle device 52 between the rest position and the depressed position. In this embodiment, the resistance element 114 has a variable electrical resistivity (Ω·m) extending along the circumference of the resistance element 114 and a variable electrical resistivity (Ω·m) extending between the first and the second resistance element ends. Rotation of the resistance element 114 relative to the potentiometer 112 results in a variable voltage output from the potentiometer 112 due to the change in the electrical resistivity (Ω·m). As such, when the cap 38 is in the first orientation, the potentiometer 112 outputs the first voltage and when the cap 38 is in the second orientation, the potentiometer 112 outputs the second voltage. Movement of the resistance element 114 along the longitudinal axis LA results in a variable voltage output from the potentiometer 112 due to the change in the electrical resistivity (Ω·m). As such, when at least a portion of the toggle device 52 is in the rest position, the potentiometer 112 outputs the fourth voltage and when at least a portion of the toggle device 52 is in the depressed position, the potentiometer 112 outputs the fifth voltage.

In all of the embodiments, the shifter assembly 20 can includes an additional sensor system (not shown) mounted in the housing 22 adjacent the shift lever 26. The additional sensor system may include any type of sensor or sensors for detecting movement of the shift lever 26 relative to the housing 22. The additional sensor system may detect movement of the shift lever 26 relative to the housing 22 from a nominal/normal position to one or more actuated positions.

The shifter assembly 20 is intended to work with the sensor system 96, which is responsive to rotation of the cap 38 between the first and said second orientations, to movement of at least a portion of the toggle device 52 between the rest position and the depressed position, or to both, to generate signals for application to a transmission controller. The shifter assembly 20 is also intended to work with the additional sensor system (not shown), which is responsive to movement of the shift lever 26 relative to the housing 22 from the normal position to one or more extended positions. The transmission controller includes a known processing logic circuit which is utilized for effecting gear shifts within the transmission in a known manner. It is to be appreciated that the transmission controller may be in communication with other components of the vehicle, such as the brake pedal for determining if the brake pedal is depressed before allowing the transmission to be shifted from park.

Referring back to the modes of transmission introduced above, in certain embodiments, the first mode of the transmission is further defined as a drive position of the transmission and the second mode of the transmission is further defined as a reverse position of the transmission. The transmission may include additional modes, which may be further defined as a neutral position, a park position, etc. of the transmission. When the cap 38 actuates between the first and second orientations (drive and reverse in this example), the rest position of the toggle device 52/button portion 74 corresponds to the automatic mode of the transmission and the depressed position of the toggle device corresponds to the manual mode of the transmission. The shift lever 26 actuates between gear positions of the transmission ($1^{st}$ gear, $2^{nd}$ rear, $3^{rd}$ gear, etc.).

As one exemplary embodiment, the toggle device 52 of the shift lever 26 actuates between the automatic mode of the transmission and the manual mode of the transmission. When the automatic mode is engaged, the cap 38 actuates between drive, reverse, neutral, and park. When the manual mode is engaged, the cap 38 actuates between drive, reverse, neutral, and park, and the shift lever 26 actuates between gear positions of the transmission.

In other embodiment, the first mode of the transmission is further defined as the automatic mode and the second mode of the transmission is further defined as the manual mode. When the cap 38 actuates between the automatic mode and the manual mode, the shift lever 26 actuates between the drive and reverse positions. The shift lever 26 may actuate to additional states, which may be further defined as neutral, park, etc. The shift lever 26 may also actuate between gear positions of the transmission. In this embodiment, the toggle device 52 may engage overdrive, traction control, park, etc.

As another exemplary embodiment, the cap 38 of the shift lever 26 actuates between the automatic mode of the transmission and the manual mode of the transmission. When the automatic mode is engaged, the shift lever 26 actuates between drive, reverse, neutral, and park. When the manual mode is engaged, the shift lever 26 actuates between drive, reverse, neutral, park, and actuates between gear positions of the transmission.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A shifter assembly for selecting a first mode and a second mode of a transmission for a vehicle, said shifter assembly comprising:
   a housing having an exterior surface;
   a shift lever movably coupled to said housing and pivotable relative to said housing, said shift lever comprising;
   a body having a first body end and a second body end with the second body end adjacent the exterior surface of said housing such that said body is located outside of said housing,
   a cap defining an aperture and being coupled to said body adjacent said first body end with said cap being rotatable relative to said body between a first orientation for selecting said first mode and a second orientation for selecting said second mode of the transmission,
   a toggle device coupled to said cap for movement with said cap between said orientations and disposed in said aperture, with at least a portion of said toggle device moveably coupled to said cap between a rest position and a depressed position,
   a biasing member disposed in said body and engaging said toggle device to bias said toggle device toward a predetermined position,
   an element mounted to said toggle device and rotatable with said toggle device and said cap between said first orientation and said second orientation, and
   a sensor system mounted in said body adjacent said toggle device and configured to interact with said element to detect rotation of said cap between said first and said second orientations.

2. The shifter assembly of claim 1, wherein said sensor system is configured to output a first voltage when said cap is in said first orientation for selecting said first mode of the transmission and configured to output a second voltage different than said first voltage when said cap is in said second orientation for selecting said second mode of the transmission.

3. The shifter assembly of claim 1, wherein said sensor system comprises a hall effect sensor and said element comprises a magnet with said magnet rotatable with said cap relative to said hall effect sensor such that said hall effect sensor outputs a first voltage when said cap is in said first orientation and outputs a second voltage when said cap is in said second orientation.

4. The shifter assembly of claim 3, wherein said hall effect sensor of said sensor system detects rotation of said cap between said first and said second orientations and detects movement of at least said portion of said toggle device between said rest position and said depressed position.

5. The shifter assembly of claim 1, wherein said sensor system comprises a hall effect sensor and a switch with said hall effect sensor detecting rotation of said cap between said first and said second orientations and said switch detecting movement of at least a portion of said toggle device between said rest position and said depressed position.

6. The shifter assembly of claim 1, wherein said sensor system comprises a potentiometer and said element comprising a resistance element with said resistance element rotatable with said cap relative to said potentiometer such that said potentiometer outputs a first voltage when said cap is in said first orientation and outputs a second voltage when said cap is in said second orientation.

7. The shifter assembly of claim 6, wherein said sensor system further includes a switch with said potentiometer detecting rotation of said cap between said first and said second orientations and said switch detecting movement of at least said portion of said toggle device between said rest position and said depressed position.

8. The shifter assembly of claim 6, wherein said potentiometer of said sensor system detects rotation of said cap between said first and said second orientations and detects movement of at least said portion of said toggle device between said rest position and said depressed position.

9. The shifter assembly of claim 6, wherein said potentiometer defines an orifice with said resistance element received by said orifice to detect rotation of said resistance element relative to said potentiometer.

10. The shifter assembly of claim 1, wherein said shift lever defines a longitudinal axis extending therethrough with said sensor system disposed along said longitudinal axis.

11. The shifter assembly of claim 1, wherein said toggle device comprises a plurality of detent surfaces with said biasing member engaging said plurality of detent surfaces to provide tactile feedback.

12. The shifter assembly of claim 11, wherein said body comprises two biasing members.

13. The shift assembly of claim 1, wherein said toggle device comprises a rotary cam drive portion and a button portion with a spring disposed between said rotary cam drive portion and said button portion to bias said button portion toward said rest position.

14. The shifter assembly of claim 13, wherein said cap is coupled to said rotary cam drive portion such that said cap is coupled to said body while permitting said rotation of said cap relative to said body.

15. The shifter assembly of claim 14 further comprising a retainer disposed between said cap and said body with said retainer coupled to said body wherein said retainer is configured to retain said rotary cam drive portion of said toggle device between said body and said cap.

16. The shifter assembly of claim 13, wherein said element is mounted to said rotary cam drive portion of said toggle device.

17. The shifter assembly of claim 1, wherein said body has a first locking member and said cap has a second locking member with said first and said second locking members engaged to each other such that said cap is coupled to said body while permitting said rotation of said cap.

18. The shifter assembly of claim 1, wherein said cap is rotatable relative to said body to a third orientation.

19. The shifter assembly of claim 1, wherein said cap comprises an indicator extension extending toward said body of said shift lever to provide indication of said orientation of said cap.

20. The shifter assembly of claim 1, wherein said shift lever is mono-stable relative to said housing.

21. The shifter assembly of claim 1, wherein the first mode of the transmission is further defined as a drive position of the transmission, and the second mode of the transmission is further defined as a reverse position of the transmission, and wherein when said cap actuates between said first and second orientations, said rest position of said toggle device corresponds to an automatic mode of the transmission and said depressed position of said toggle device corresponds to a manual mode of the transmission.

* * * * *